(12) United States Patent
Cray et al.

(10) Patent No.: US 7,592,412 B2
(45) Date of Patent: Sep. 22, 2009

(54) SILICONE RELEASE COATING COMPOSITIONS

(75) Inventors: Stephen Edward Cray, Sully (GB); Robert Alan Ekeland, Midland, MI (US); Peter Cheshire Hupfield, Trevaughan (GB); Sarah O'Hare, Nr. Barry (GB); David A. Rich, Barry (GB); Marc Thibaut, Chapelle-Lez-Herlaimont (BE)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/555,509

(22) PCT Filed: Jul. 2, 2004

(86) PCT No.: PCT/EP2004/007806

§ 371 (c)(1),
(2), (4) Date: Aug. 6, 2006

(87) PCT Pub. No.: WO2005/005544

PCT Pub. Date: Jan. 20, 2005

(65) Prior Publication Data

US 2007/0167563 A1 Jul. 19, 2007

(30) Foreign Application Priority Data

Jul. 10, 2003 (GB) ................. 0316162.7

(51) Int. Cl.
C08G 77/04 (2006.01)
C08G 77/08 (2006.01)
C08G 77/12 (2006.01)
C08G 77/20 (2006.01)
C07F 9/06 (2006.01)

(52) U.S. Cl. .............. 528/21; 528/23; 528/31; 528/32; 528/37; 564/12

(58) Field of Classification Search ............ 524/588
See application file for complete search history.

(56) References Cited

U.S. PATENT DOCUMENTS

| | | | | |
|---|---|---|---|---|
| 4,476,166 A | * | 10/1984 | Eckberg | 427/387 |
| 4,689,384 A | | 8/1987 | Kondow et al. | 528/15 |
| 5,468,824 A | * | 11/1995 | Togashi et al. | 528/12 |
| 5,545,682 A | * | 8/1996 | Kaiya et al. | 524/265 |
| 5,883,215 A | * | 3/1999 | Bischoff et al. | 528/21 |
| 5,906,893 A | * | 5/1999 | Stein | 428/447 |
| 6,020,412 A | * | 2/2000 | Muschelewicz et al. | 524/296 |
| 6,284,859 B1 | * | 9/2001 | Hupfield et al. | 528/23 |
| 6,346,593 B1 | * | 2/2002 | Hupfield et al. | 528/23 |
| 6,353,075 B1 | * | 3/2002 | Hupfield et al. | 528/23 |
| 6,569,914 B2 | * | 5/2003 | Zoellner et al. | 522/99 |
| 2002/0061998 A1 | * | 5/2002 | Cray et al. | 528/32 |
| 2002/0123569 A1 | * | 9/2002 | Koyama et al. | 525/100 |
| 2005/0075020 A1 | * | 4/2005 | Benayoun et al. | 442/87 |
| 2005/0256286 A1 | * | 11/2005 | Asch et al. | 528/31 |
| 2006/0074212 A1 | * | 4/2006 | Chapman et al. | 528/15 |
| 2006/0111491 A1 | * | 5/2006 | Asch et al. | 524/261 |

FOREIGN PATENT DOCUMENTS

| | | | |
|---|---|---|---|
| EP | 0 860 459 | | 8/1998 |
| EP | 1 070 734 | | 7/2001 |
| JP | 61-162561 | | 7/1986 |
| JP | 62-241964 | | 10/1987 |
| WO | WO 03/054059 | * | 7/2003 |
| WO | WO 03/093349 | | 11/2003 |
| WO | WO 03/093369 | | 11/2003 |
| WO | WO 2004/058858 | * | 7/2004 |

* cited by examiner

Primary Examiner—Randy Gulakowski
Assistant Examiner—Robert Loewe
(74) Attorney, Agent, or Firm—Alan Zombeck; Sharon K. Brady

(57) ABSTRACT

A release coating composition according to the present invention comprises an alkenyl functional polysiloxane (1), a silicon hydride functional polysiloxane (11) and a catalyst (111) comprising a platinum group metal. The alkenyl functional polysiloxane (1) is an alkenylterminated polysiloxane prepared by siloxane polycondensation and/or equilibration using a phosphazene base catalyst followed by neutralisation with an acidic neutralising agent. The level of catalyst (III) in the composition can be as low as 2-40 parts per million platinum group metal by weight.

5 Claims, No Drawings

SILICONE RELEASE COATING COMPOSITIONS

CROSS REFERENCE TO RELATED APPLICATIONS

This application is a U.S. national stage filing under 35 U.S.C. §371 of PCT Application No. PCT/EP2004/00780 filed on Jul. 2, 2004, currently pending, which claims the benefit of GB Patent Application No. 0316162.7 filed Jul. 10, 2003 under 35 U.S.C. §119 (a)-(d) and 35 U.S.C. §365(a). PCT Application No. PCT/EP2004/00780 and Patent Application No. 0316162.7 are hereby incorporated by reference.

FIELD OF THE INVENTION

This invention relates to silicone based release coating compositions and to novel branched alkenyl functional siloxanes, useful in release compositions, and their preparation.

BACKGROUND TO THE INVENTION

Silicone based release coatings are useful in applications where relatively non-adhesive surfaces are required. Single sided liners, for example, backing papers for pressure sensitive adhesive labels, are usually adapted to temporarily retain the labels without affecting the adhesive properties of the labels. Double sided liners for example, interleaving papers for double sided and transfer tapes, are utilised to ensure the protection and desired unwind characteristics of a double sided self-adhesive tape or adhesive film.

A substrate, for example a single sided liner, is coated by applying a silicone based release coating composition onto the substrate and subsequently curing the composition, by, for example, thermally initiated hydrosilylation. The basic constituents of silicone based release coating compositions which are cured by hydrosilylation are an alkenyl functional polydiorganosiloxane, typically a linear polymer with terminal alkenyl groups, a polyorganohydrogensiloxane cross-linking agent, designed to cross-link the alkenyl polydiorganosiloxane and a catalyst for the cross-linking reaction, usually a complex or compound of a group VIII metal (platinum group metal) such as platinum, ruthenium, rhodium, palladium, osmium or indium.

Improvements in the performance of release coatings are continuously being sought with respect to, for example, ease of cure, i.e. the decrease in cure times at relatively low temperatures, release performance and anchorage of coatings to various substrates, including polypropylene, polyethylene and polyester as well as paper.

EP-A-1070734 describes a release coating composition comprising a branched siloxane consisting of one or more Q units of the formula ($SiO_{4/2}$), from 15 to 995 D units of the formula $Rb2SiO_{2/2}$, and M units of the formula $R^a R^b_2 SiO_{1/2}$, at least three $R^a$ substituents in the branched siloxane being alkenyl or alkynyl. Release coatings based on such Q-branched polymers both cure at relatively low temperatures, for example at 80-150° C., particularly 100-120° C., and have improved long term anchorage properties. As the cure is good at low temperatures there is minimal transfer of silicones to an adhesive such as the adhesive on a label, which in turn provides the benefit that the strength of the adhesive is maintained. The branched siloxane can be prepared by mixing a compound having the general formula ($SiO_{4/2}$)($R^a R^b_2 SiO_{1/2})_4$ with a cyclic polydiorganosiloxane, and/or a substantially linear hydroxy terminated polydiorganosiloxane, causing the mixture to react in the presence of an acid or phosphazene base catalyst at a temperature of up to 180° C., and neutralising the reaction mixture.

SUMMARY OF THE INVENTION

A release coating composition according to the present invention comprises an alkenyl functional polysiloxane (I), a silicon hydride functional polysiloxane (II) and a catalyst (III) comprising a platinum group metal, characterised in that the alkenyl functional polysiloxane (I) is an alkenyl-terminated polysiloxane prepared by siloxane polycondensation and/or equilibration using a phosphazene base catalyst and that the level of catalyst (III) in the composition is 2-60 parts per million platinum group metal by weight.

While release coatings based on rapid curing alkenyl siloxane polymers such as the Q-branched polymers described in EP-A-1070734 cure at fast line speeds, typically 0.8-3.0 seconds at a web temperature of 115° C., a high level of Pt (about 80-120 ppm) is normally employed in order to achieve fast cure. This adds significant cost to the formulated release coating bath. We have found that when the release coating composition is based on an alkenyl-terminated polysiloxane, preferably a Q-branched polymer, prepared by siloxane polycondensation and/or equilibration using a phosphazene base catalyst, this speed of cure can be achieved using a reduced level of Pt catalyst. If the preparation of the branched alkenyl siloxane using a phosphazene base catalyst is carried out at low catalyst levels and with careful neutralisation of the phosphazene base catalyst, the level of catalyst (III) in the release coating composition required for fast cure can be reduced to 60 parts per million platinum group metal by weight or less, for example 2-60 ppm Pt, particularly 5-40 ppm Pt.

Thus according to another aspect of the invention, a process for the preparation of a branched alkenyl functional polysiloxane (I) capable of reacting with a silicon hydride functional polysiloxane at low levels of platinum group metal catalyst to form a release coating is characterised by reacting a compound (1a) having the empirical formula ($SiO_{4/2}$)($R^a R^b_2 SiO_{1/2})_x$ wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms, at least three Ra substituents in the compound (1a) being alkenyl or alkynyl units; each $R^b$ substituent is selected from the group consisting of an alkyl group having from 1 to 6 carbon atoms, an aryl group, an alkoxy group, an acrylate group and a methacrylate group; and the ratio x of ($R^a R^b_2 SiO_{1/2}$) groups to ($SiO_{4/2}$) units is in the range 2.5 to 4, with a cyclic polydiorganosiloxane and/or a substantially linear hydroxy terminated polydiorganosiloxane in the presence of 2 to 80 parts per million of a phosphazene base catalyst based on the weight of silicon-containing materials and neutralising the reaction mixture.

DETAILED DESCRIPTION OF THE INVENTION

The alkenyl functional polysiloxane (I) is preferably a Q-branched siloxane of the type described in EP-A-1070734, that is a branched siloxane consisting of:— i) one or more Q units of the formula ($SiO_{4/2}$), ii) from 15 to 995 D units of the formula $R^b_2 SiO_{2/2}$ which units (i) and (ii) may be inter-linked in any appropriate combination, and iii) M units of the formula $R^a R^b_2 SiO_{1/2}$, wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms, at least three Ra substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group and a methacrylate group.

Preferably at least 50% of $R^a$ substituents are alkenyl groups. Most preferably each $R^a$ substituent is an alkenyl group. Each alkenyl group may be selected from vinyl, allyl, butenyl, pentenyl and hexenyl groups but is preferably selected from a vinyl (vi) and a hexenyl (hex) group.

The compound (1a) comprises at least one Q unit $(SiO_{4/2})$ bonded to M units $(R^a R^b_2 SiO_{1/2})$ and most preferably consists substantially of the compound $(SiO_{4/2})(R^a R^b_2 SiO_{1/2})_4$ having a M/Q ratio x of 4, for example tetra(dimethylvinylsiloxy)silane.

Preferably the cyclic polydiorganosiloxane which is reacted with the compound (1a) contains from 3 to 10 $R^b_2 SiO_{2/2}$ units although it is preferred that the cyclic polydiorganosiloxanes are polydialkylsiloxane rings consisting of from 3 to 6 repeating $R^b_2 SiO_{2/2}$ units in which each $R^b$ substituent is a methyl group, for example octamethylcyclotetrasiloxane (D4) or deacmethylcyclopentasiloxane (D5).

Alternatively the compound (1a) can be reacted with a substantially linear hydroxy terminated polydiorganosiloxane, which preferably has the formula

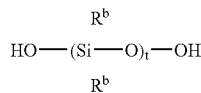

in which each $R^b$ preferably denotes an alkyl group having from 1 to 6 carbon atoms, most preferably a methyl group. The value of t is preferably such that the average viscosity of the polydiorganosiloxane does not exceed 200 mm²/s at 25° C.

The phosphazene base catalyst can, for example, be a phosphazene base of one of the following general formulae:

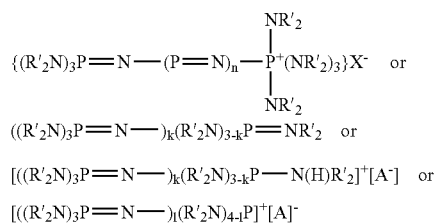

in which R', which may be the same or different in each position, is hydrogen or an optionally substituted hydrocarbon group, preferably a $C_1$-$C_4$ alkyl group, or in which two $R^1$ groups bonded to the same N atom may be linked to complete a heterocyclic ring, preferably a 5- or 6-membered ring; n is in the range 1 to 6; k is 1, 2 or 3, preferably 2 or 3; l is 1, 2, 3 or 4, preferably 2, 3 or 4; and A is an anion, preferably fluoride, hydroxide, silanolate, alkoxide, carbonate or bicarbonate. Particularly preferred are aminophosphazenium hydroxides. Suitable catalysts and their preparation are described for example in EP-A-1008598.

The phosphazene base catalyst is preferably present at least 1 part per million and less than 80 ppm, more preferably less than 50 ppm, most preferably at 2 to 40 ppm, for example 5 to 20 ppm, based on the weight of silicon-containing materials in the reaction. Use of such low levels of phosphazene base catalyst in preparation of the branched alkenyl siloxane polymer reduces the risk of lowering the activity of the platinum metal catalyst in the release coating composition.

The method of the invention may conveniently be carried out at room temperature or at temperatures as high as 250° C. or 300° C. or even higher. The preferred temperature range may be from 50 to 170° C. The polymerisation can be carried out in bulk or in the presence of a solvent. Suitable solvents are liquid hydrocarbons or silicone fluids. The phosphazene base catalyst can be diluted in a solvent such as toluene or dispersed in a silicone fluid such as polydiorganosiloxanes. We have found that phosphazene base catalysts can produce branched siloxane polymers according to the invention very quickly even at moderate to low temperatures (20-170° C.) and low catalyst levels.

The degree of polymerisation DP (number of siloxane units, mainly D units, per molecule) of the branched siloxane polymer can be controlled by controlling the molar ratio of the compound 1a to the cyclic polydiorganosiloxane and/or substantially linear hydroxy terminated polydiorganosiloxane present in the reaction, since the M units of (1a) act as end-blockers in the polymerisation reaction. The branched siloxane polymer preferably has a DP in the range 40 to 300.

The reaction mixture produced is neutralised with an acidic neutralising agent. According to one preferred aspect of the invention the neutralising agent is a solid acidic neutralising agent which is removed from the reaction mixture after neutralisation. Examples of preferred solid acidic neutralising agents are silica or an acrylic acid polymer. The acidic silica can be produced by spray acid treatment of precipitated silica and is sold for example under the trade mark MS-75-D. The acrylic acid polymer can for example be polyacrylic acid of molecular weight in the range 1000 to 10000000 or a copolymer of acrylic acid, for example with ethylene, methacrylic acid, maleic anhydride and/or an acrylate or methacrylate ester. The acrylic acid polymer can be partially neutralised, for example by an alkali metal such as sodium, provided that it still has acid pH.

According to another preferred aspect of the invention the reaction mixture produced is neutralised with a substantially stoichiometric amount of an acidic neutralising agent based on the phosphazene base present. This is preferred for the solid acidic neutralising agents discussed above and is particularly important for liquid neutralising agents. Examples of liquid neutralising agents are silyl phosphonates and silyl phosphates, for example a bis(trimethylsilyl)phosphonate such as bis(trimethylsilyl)vinylphosphonate, or bis(trimethylsilyl)phosphate.

In addition to the alkenyl-terminated polysiloxane prepared by siloxane polycondensation and/or equilibration using a phosphazene base catalyst, the release coating composition may additionally contain another alkenyl-terminated polysiloxane, for example a dialkylalkenylsilyl-terminated linear polydiorganosiloxane having a viscosity at 25° C. of at least 50 mm²/s. If such a linear polydiorganosiloxane is present, a dimethylvinylsilyl-terminated or dimethylhexenylsilyl-terminated polydimethylsiloxane is preferred.

The silicon hydride functional polysiloxane (II) of the release coating composition generally contains at least three Si—H groups and may have the general formula:—

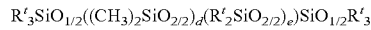

where each $R'$ may be an alkyl group having 1 to 4 carbon atoms or hydrogen, d is 0 or an integer, e is an integer such that d+e is from 8 to 100. It is preferably a polysiloxane containing methylhydrogensiloxane units. It can for example be a linear poly(methylhydrogep)siloxane having trimethylsilyl or hydrogendimethylsilyl end groups, or a copolymer having methylhydrogensiloxane units and dimethylsiloxane units.

Release coating compositions containing branched alkenyl siloxane polymers produced according to the invention cure at low temperature with low levels of platinum metal catalyst using conventional linear poly(methylhydrogen)siloxane crosslinking agents as described above Even faster cure can be achieved by using the branched alkenyl siloxane polymers produced according to the invention in conjunction with the cyclic organohydrogensilicon crosslinker compounds disclosed in pending U.S. applications Ser. No. 377425 and Ser. No. 377505, which contain at least one silicon-bonded hydrogen atom per molecule and at least one cyclosiloxane and generally have the formula

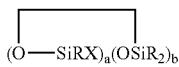

where each R is independently selected from a hydrogen atom and a monovalent hydrocarbon group comprising 1 to 20 carbon atoms which is free from aliphatic unsaturation, at least one R being a hydrogen atom, a is an integer from 1 to 18, b is an integer from 2 to 19, a+b is an integer from 3 to 20, each X is an independently selected functional group selected from a halogen atom, an ether group, an alkoxy group, an alkoxyether group, an acyl group, an epoxy group, an amino group, or a silyl group, or a -Z-$R^4$ group, where each Z is independently selected from an oxygen and a divalent hydrocarbon group comprising 2 to 20 carbon atoms, each $R^4$ group is independently selected from —$BR_uY_{2-u}$, —$SiR_vY_{3-v}$, or a group described by formula (II):

$(Y_{3-n}R_nSiO_{1/2})_c(Y_{2-o}R_oSiO_{2/2})_d(Y_{1-p}R_pSiO_{3/2})_e$
$(SiO_{4/2})_f(CR_qY_{1-q})_g(CR_rY_{2-r})_h(O(CR_sY_{2-s})_i$
$(CR_tY_{3-t})_j$ where B refers to boron, each R is as described above, the sum of c+d+e+f+g+h+i+j is at least 2, n is an integer from 0 to 3, o is an integer from 0 to 2, p is an integer from 0 to 1, q is an integer from 0 to 1, r is an integer from 0 to 2, s is an integer from 0 to 2, t is an integer from 0 to 3, u is an integer from 0 to 2, v is an integer from 0 to 3, each Y is an independently selected functional group selected from a halogen atom, an ether group, an alkoxy group, an alkoxyether group, an acyl group, an epoxy group, an amino group, or a silyl group, or a Z-G group, where Z is as described above, each G is a cyclosiloxane described by the formula:

where R and X are as described above, k is an integer from 0 to 18, m is an integer from 0 to 18, k+m is an integer from 2 to 20, provided in formula (II) that one of the Y groups is replaced by the Z group bonding the $R^4$ group to the cyclosiloxane of formula (I), and provided further (a) at least one X group of Formula (I) is a -Z-$R^4$ group, (b) if Z is a divalent hydrocarbon group, a=1, c=2, e+f+g+h+i+j=0 and d>0, then at least one d unit (i.e. $Y_{2-o}R_oSiO_{2/2}$) contain a -Z-G group or the c units (i.e. $Y_{3-n}R_nSiO_{1/2}$) have no -Z-G group or at least two -Z-G groups, (c) if Z is a divalent hydrocarbon group, a=1, c=2 and d+e+f+g+h+i+j=0, then the c units (i.e. $Y_{3-n}R_n$-$SiO_{1/2}$) have no -Z-G group or at least two -Z-G groups, and (d) if g+h+i+j>0 then c+d+e+f>0.

The most preferred organohydrogensilicon compounds described by formula (I) are as follows where Me is methyl, d is an average of 8 and x is an integer from 1 to 15:

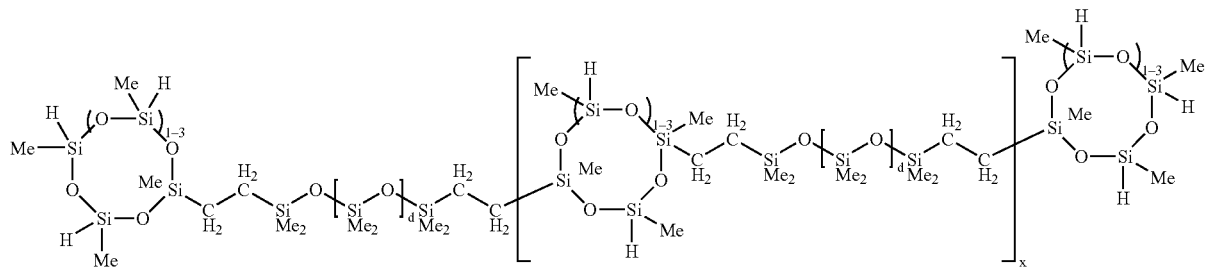

Alternatively the silicon hydride functional polysiloxane cross-linking agent may be an MQ resin consisting of units of the general formula $SiO_{4/2}$ and $R^q_3SiO_{1/2}$ wherein at least one $R^q$ substituent is a hydrogen atom and the remainder are alkyl groups.

Preferably the ratio of the total amount of Si—H groups to alkene groups in the release coating composition is in the range of from 1.1:1 to 2.5:1, most preferably from 1.2:1 to 2:1.

Preferred catalysts (III) are platinum compounds or complexes including chloroplatinic acid, platinum acetylacetonate, complexes of platinous halides with unsaturated compounds, for example, ethylene, propylene, organovinylsiloxanes and styrene, hexamethyldiplatinum, $PtCl_2.PtCl_3$ and $Pt(CN)_3$. Alternatively the catalyst may be a rhodium complex, for example, $RhCl_3(Bu_2S)_3$.

The composition may additionally comprise one or more inhibitors adapted to prevent the cure of the coating composition from occurring below a predetermined temperature. Such an inhibitor is generally used in silicone release coatings which cure by hydrosilylation and may be used in the compositions according to the present invention, although an inhibitor may not be necessary at the lower levels of platinum metal catalyst. Examples of suitable inhibitors include ethylenically or aromatically unsaturated amides, acetylenic compounds, ethylenically unsaturated isocyanates, olefinic siloxanes, unsaturated hydrocarbon diesters, conjugated ene-ynes, hydroperoxides, nitrites and diaziridines, specific examples include methyl butynol, dimethyl hexynol or ethynyl cyclohexanol, trimethyl(3,5-dimethyl-1-hexyn-3-oxy)silane, a maleate for example, Bis(2-methoxy 1-methylethyl)maleate, a fumarate e.g. diethylfumarate or a fumarate/alcohol mixture wherein the alcohol is, for example, benzyl alcohol or 1-octanol and ethenyl cyclohexyl-1-ol.

Other constituents which may also be added to release coating compositions of the present invention include, for example, silicone release modifiers, fillers, reactive diluents, adhesion promoters, solvents, fragrances, preservatives and fillers, for example, silica, quartz and chalk.

The release modifier is added to control the level of release force of the release coating, that is to increase the force required to separate an adhesive-coated label from its release-coated backing sheet, compared to a premium release coating comprising only alkenyl functional polysiloxane (I), silicon hydride functional polysiloxane (II) and catalyst (III). Examples of suitable release modifiers include one or more of an alkenylated silicone resin, for example a vinyl-functional or hexenyl-functional MQ resin, an alkenylated polydiorganosiloxane, a primary alkene containing from 10 to 30 carbon atoms, for example tetradecene or octadecene, or a branched alkene containing at least 10 carbon atoms, preferably a branched alkene containing at least 20 carbon atoms of the formula $CH_2=CYY'$ where Y is a linear alkyl group having 1-12 C atoms and Y' is a linear or branched alkyl group having 8-50 C atoms.

A release modifier composition is usually sold as a separately packaged component of the release coating composition in which the release modifier replaces a proportion of the alkenyl polysiloxane of a premium release coating composition. The invention thus includes a release modifier composition comprising a branched alkenyl functional siloxane prepared using a phosphazene base catalyst as described above and a release modifier selected from alkenylated silicone resins, alkenylated polydiorganosiloxanes, primary alkenes containing from 10 to 30 carbon atoms and branched alkenes containing at least 10 carbon atoms. The release modifier is preferably present at 25 to 85% by weight of the branched alkenyl functional siloxane.

Bath life extenders may be present in an amount sufficient to retard the curing reaction at room temperature. Examples include compounds which contain one or more primary or secondary alcohol groups, for example aliphatic and aromatic alcohols with fewer than 10 carbon atoms such as methanol, ethanol, propanol, phenol or cyclohexanol, carboxylic acids and cyclic ethers.

The release coating composition of the invention generally has a viscosity of not less than 50 mm$^2$/s and not more than 10000 mm$^2$/s at 25° C., so that the branched siloxane is of a suitable viscosity for coating a substrate. Preferably the viscosity is from 50 to 1000 mm$^2$/s. The release coating compositions may be applied solventless or in a solvent or as part of an oil-in-water emulsion.

While release coating compositions of the present invention may be prepared by merely premixing the components (I), (II) and (III) together with any optional ingredients present it may be more desirable to prepare such compositions in separate parts or packages to be combined at the time the composition is to be applied as a coating. For example the composition may comprise a first package comprising the branched alkenyl functional polysiloxane and inhibitor, a second package comprising release modifier and inhibitor, a third package comprising the catalyst and a fourth package comprising the cross-linking agent. In one alternative a first package comprises the branched alkenyl functional polysiloxane and catalyst, a second package comprises release modifier and catalyst and a third package comprises the cross-linking agent and inhibitor.

The present coating composition may be utilised for release purposes on a variety of substrates including paper and films. The films may for example be polyethylene, polypropylene, polyester, polystyrene, oriented polypropylene or biaxially oriented polypropylene films.

The release coating compositions of the present invention have the advantages of rapid cure for fast line speeds, typically 0.8-3.0 seconds at a web temperature of 100-115° C., and reduced smoking and extractables when used with release modifiers, described in EP-A-1070734, together with the economic advantage of being able to use low platinum metal catalyst levels.

The invention is illustrated by the following Examples, in which parts and percentages are by weight unless otherwise stated.

EXAMPLE 1

350 g tetra(dimethylvinylsiloxy)silane and 4.65 kg D4 were mixed at 20° C. and 0.20 g polyaminophosphazenium hydroxide catalyst was admixed (40 ppm based on siloxanes), causing a rapid increase in viscosity. After a period of 30 seconds the reaction mixture was then neutralised with 25 g (0.5%) polyacrylic acid of molecular weight Mw=2000. Low molecular weight components were stripped out of the mixture and the reaction product was filtered to remove excess polyacrylic acid and neutralised catalyst. The product was a dimethylvinyl-termiinated Q-branched polysiloxane having a DP of 160 and viscosity of 220 mPa·s.

100 g of this Q-branched polysiloxane was mixed with 3.3 g trimethyl-terminated poly(methylhydrogensiloxane) having a viscosity of 11 mPa·s and 0.8 g parts of the catalyst reaction product of chloroplatinic acid and divinyltetramethyldisiloxane (0.5% Pt; 40 ppm Pt based on siloxane) to form a release coating composition. This composition was coated on glassine paper. Separate samples were cured at an oven temperature of 100° C. for 15 seconds and at an oven temperature of 115° C. for 20 seconds.

For each experiment, a portion of the cured coated film was immersed in a solution of methyl isobutyl ketone solvent to extract any siloxane which had not been cross-linked. After an hour the sample was removed from the solvent, dried and reweighed. The % extractables is the % weight loss and is a measure of cure (100% extractables=no cure, 0% extractables=complete cure). The sample of Example 1 cured at an oven temperature of 100° C. for 15 seconds had 9.1% extractables and the sample cured at an oven temperature of 115° C. for 20 seconds had 7.3% extractables.

COMPARATIVE EXAMPLE C1

By comparison, when the dimethylvinyl-terminated Q-branched polysiloxane was replaced by a dimethylvinyl-terminated Q-branched polysiloxane of similar DP prepared using trifluoromethanesulphonic acid as catalyst, the sample cured at an oven temperature of 100° C. for 15 seconds had 13.3% extractables and when cured at an oven temperature of 115° C. for 20 seconds had 9.3% extractables.

EXAMPLES 2 TO 9

Example 1 was repeated varying the temperature of preparation of the dimethylvinyl-terminated Q-branched polysiloxane and the molecular weight and amount of the polyacrylic acid used for neutralisation. The extractables of various cured release coatings were measured as described in Example 1 and are shown in Table 1 below

TABLE 1

| Example | 1 | 2 | 3 | 4 | 5 | 6 | 7 | 8 | 9 |
|---|---|---|---|---|---|---|---|---|---|
| Mw of Acid | 2000 | 2000 | 2000 | 2000 | 450000 | 750000 | 750000 | 750000 | 750000 |
| Quantity/% | 0.5 | 2 | 0.5 | 2 | 1.25 | 0.5 | 2 | 0.5 | 2 |
| Temperature/C. | 20 | 20 | 70 | 70 | 45 | 20 | 20 | 70 | 70 |
| Extractables | | | | | | | | | |
| 100 C./15 sces | 9.1 | 9.5 | 10.7 | 7.9 | 7.1 | 8.9 | 6.3 | 8.7 | 5.7 |
| 115 C./15 sces | 7.3 | 8.3 | 8.8 | 8.6 | 6.4 | 9.4 | 7 | 8.3 | 5.5 |

EXAMPLES 10 TO 12

The process of Example 6 was repeated using lower levels of the phosphazene base catalyst in preparation of the dimethylvinyl-terminated Q-branched polysiloxane. Release coatings were prepared from the resulting polymers and cured and tested as described in Example 1. The results are shown in Table 2.

TABLE 2

| | Example | | |
|---|---|---|---|
| | 10 | 11 | 12 |
| | Quantity of Phosphazine | | |
| Extractables | 12.25 ppm | 10 ppm | 5 ppm |
| 100 C./15 secs | 12.2 | 12.3 | 9.9 |
| 115 C./15 secs | 6.9 | 6.8 | 8.7 |

It will be seen that in all cases the release coating of the invention is more fully cured (less extractables) than the coating of the Comparative Example C1.

EXAMPLES 13 TO 15

The process of Example 11 was repeated except that the polyacrylic acid used to neutralise the branched alkenyl polysiloxane reaction product was replaced by various levels of an acidic silica sold under the trademark MS-75D. The neutralised reaction product was formulated into a release coating composition having a catalyst level of 20 ppm Pt and tested as described in Example 1(b). The results are shown in Table 3 below

TABLE 3

| | Example | | |
|---|---|---|---|
| | 13 | 14 | 15 |
| Acidic silica % | 0.05 | 0.1 | 0.3 |
| Extractables at 100 C./15 sces | 24.9 | 19 | 17.9 |
| Extractables at 115 C./15 sces | 15.3 | 13 | 13 |

EXAMPLES 16 TO 18

The process of Examples 13 to 15 was repeated using as the neutralising agent various levels of polyacrylic acid of Mw 2000. The results are shown in Table 4 below

TABLE 4

| | Example | | |
|---|---|---|---|
| | 16 | 17 | 18 |
| Polyacrylic acid % | 0.05 | 0.1 | 0.3 |
| Extractables at 100 C./15 sces | 19.5 | 17.2 | 17.7 |
| Extractables at 115 C./15 sces | 15 | 13.7 | 10.1 |

EXAMPLES 19 TO 21

The process of Examples 13 to 15 was repeated using as the neutralising agent various levels of polyacrylic acid of Mw 4000000. The results are shown in Table 5 below

TABLE 5

| | Example | | |
|---|---|---|---|
| | 19 | 20 | 21 |
| Polyacrylic acid % | 0.05 | 0.1 | 0.3 |
| Extractables at 100 C./15 sces | 19.2 | 15.9 | 15.2 |
| Extractables at 115 C./15 sces | 17 | 13.5 | 14.7 |

EXAMPLES 22 TO 24

The process of Examples 13 to 15 was repeated using as the neutralising agent various levels of an acrylic acid ethylene copolymer. The results are shown in Table 6 below

TABLE 6

| | Example | | |
|---|---|---|---|
| | 22 | 23 | 24 |
| Ethylene-co-acrylic acid % | 0.05 | 0.1 | 0.3 |
| Extractables at 100 C./15 secs | 18.9 | 25.2 | 24.5 |
| Extractables at 115 C./15 secs | 14.3 | 18.9 | 22.4 |

EXAMPLE 25

The Q-branched polymer prepared in Example 1 was mixed with sufficient poly(methylhydrogensiloxane) to give a SiH:vinyl molar ratio of 1.6:1, 0.4% of the catalyst reaction product of chloroplatinic acid and divinyltetramethyldisiloxane (20 ppm Pt based on siloxane) and 0.2% ethynyl cyclohexanol to form a release coating composition. In various trial runs on a paper coating machine, the composition was coated on a glassine paper web and cured at different line speeds and temperatures. The line speeds were 90 and 60 m/min corresponding to dwell times of 3 and 4.5 seconds respectively.

The temperatures used were 138° C., 149° C., 160° C. and 171° C. measured as the exit temperature of the web. Each coated paper sample was then tested for smear, anchorage and migration.

Smear and anchorage are tested by rubbing a finger over the silicone coated substrate. If this leaves tracks (smear) there is gross under cure of the silicone. If finger rubbing removes silicone from the substrate there is poor anchorage; if the silicone is well anchored no silicone will be removed. In the migration test a pressure sensitive adhesive tape such as 'Sellotape'™ is pressed by hand on to the sheet of silicone coated substrate. The tape is then removed and the adhesive ends of the tape are stuck together. The tape is then pulled apart. If small amounts of uncured silicone are present because of migration of silicone to the adhesive, there is a substantial reduction in the adhesion of the pressure sensitive adhesive to itself and the tape is easily pulled apart (silicone acting as a release agent). If very little silicone is present (no migration) then a higher amount of force is required to pull the tape apart, similar to that required to pull apart two untreated tape ends stuck together. For each line speed, the minimum cure temperature to achieve no smear, migration or loss of anchorage was measured. The results are shown in Table 7 below.

EXAMPLES 26 TO 28

The process of Example 25 was repeated replacing the Q-branched polymer of Example 1 by the following polymers:

Example 26—the Q-branched polymer of Example 14 neutralised using acidic silica

Example 27—Q-branched polymer neutralised using bis(trimethylsilyl)vinylphosphonate.

Example 28—Q-branched polymer neutralised using bis(trimethylsilyl)hydrogenphosphate.

COMPARATIVE EXAMPLE C2

The process of Example 25 was repeated replacing the Q-branched polymer of Example 1 by a dimethylvinyl-terminated Q-branched polysiloxane of similar DP prepared using trifluoromethanesulphonic acid as catalyst.

The results of Examples 25 to 28 and of Comparative Example C2 are shown in Table 7 below.

TABLE 7

| Example No | Minimum temp. at 3 sec. dwell time | Minimum temp. at 4.5 sec. dwell time |
| --- | --- | --- |
| 25 | 149° C. | 149° C. |
| 26 | 160° C. | 160° C. |
| 27 | 149° C. | 149° C. |
| 28 | 149° C. | 149° C. |
| C2 | 171° C. | 160° C. |

EXAMPLE 29

A dimethylvinyl-terminated Q-branched polysiloxane was prepared as described in Example 1 but increasing the amount of tetra(dimethylvinylsiloxy)silane to 750 g and using bis (trimethylsilyl)phosphate as neutralising agent. The Q-branched polysiloxane product had a DP of 75.

The process of Example 25 was repeated using the above dimethylvinyl-terminated Q-branched polysiloxane in place of that of Example 25. Trial runs were carried out at a line speed of 90 m/min (dwell time 3 seconds) at web exit temperatures of 127° C., 138° C., 149° C. and 160° C. The minimum temperature to achieve no migration was 138° C.

Trial runs were also carried out at a line speed of 150 m/min corresponding to a dwell time of 2 seconds at web exit temperatures of 127 and 149° C. The coated papers showed migration at 127° C. but no migration at 149° C.

The invention claimed is:

1. A release coating composition comprising an alkenyl functional polysiloxane (I), consisting of:
   i) one or more Q units of the formula $(SiO_{4/2})$,
   ii) from 15 to 995 D units of the formula $R^b{}_2SiO_{2/2}$, and
   iii) M units of the formula $R^a R^b{}_2 SiO_{1/2}$,
wherein each $R^a$ substituent is selected from the group consisting of an alkyl group having from 1 to 6 carbon atoms, an alkenyl group having from 2 to 6 carbon atoms and an alkynyl group having from 2 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group and a methacrylate group
   a silicon hydride functional polysiloxane (II) having the formula

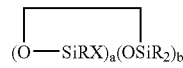

where each R is independently selected from a hydrogen atom and a monovalent hydrocarbon group comprising 1 to 20 carbon atoms which is free from aliphatic unsaturation, at least one R being a hydrogen atom, a is an integer from 1 to 18, b is an integer from 2 to 19, a+b is an integer from 3 to 20, each X is an independently selected functional group selected from a halogen atom, an ether group, an alkoxy group, an alkoxyether group, an acyl group, an epoxy group, an amino group, a silyl group, or a $-Z-R^4$ group, where each Z is independently selected from an oxygen and a divalent hydrocarbon group comprising 2 to 20 carbon atoms, each $R^4$ group is independently selected from $-BR_uY_{2-u}$, $-SiR_vY_{3-v}$, or a group described by formula (II):

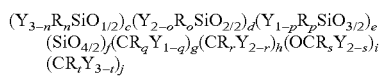

where B refers to boron, each R is as described above, the sum of c+d+e+f+g+h+i+j is at least 2, n is an integer from 0 to 3, o is an integer from 0 to 2, p is an integer from 0 to 1, q is an integer from 0 to 1, r is an integer from 0 to 2, s is an integer from 0 to 2, t is an integer from 0 to 3, u is an integer from 0 to 2, v is an integer from 0 to 3, each Y is an independently selected functional group selected from a halogen atom, an ether group, an alkoxy group, an alkoxyether group, an acyl group, an epoxy group, an amino group, or a silyl group, or a Z-G group, where Z is as described above, each G is a cyclosiloxane described by the formula:

where R and X are as described above, k is an integer from 0 to 18, m is an integer from 0 to 18, k+m is an integer from 2 to 20, provided in formula (II) that one of the Y groups is replaced by the Z group bonding the $R^4$ group to the cyclosiloxane of formula (I), and provided further (a) at least one X group of Formula (I) is a -Z-$R^4$ group, (b) if Z is a divalent hydrocarbon group, a=1, c=2, e+f+g+h+i+j=0 and d>0, then at least one d unit (i.e. $Y_{2-o}R_oSiO_{2/2}$) contain a -Z-G group or the c units (ie. $Y_{3-n}R_nSiO_{1/2}$) have no -Z-G group or at least two -Z-G groups, (c) if Z is a divalent hydrocarbon group, a=1, c=2 and d+e+f+g+h+i+j=0, then the c units (i.e. $Y_{3-n}R_n$-$SiO_{1/2}$) have no -Z-G group or at least two -Z-G groups, and (d) if g+h+i+j>0 then c+d+e+f>0
and a catalyst (III) comprising a platinum group metal, wherein the alkenyl functional polysiloxane (I) is an alkenyl-terminated polysiloxane prepared by siloxane polycondensation and/or equilibration using a phosphazene base catalyst and that the level of catalyst (III) in the composition is 2-40 parts per million platinum group metal by weight.

2. A process for the preparation of a branched alkenyl functional polysiloxane (I) capable of reacting with a silicon hydride functional polysiloxane at 2-40 parts per million by weight of platinum group metal catalyst to form a release coating, wherein the process comprises reacting a compound having the empirical formula $(SiO_{4/2})(R^aR^b{}_2SiO_{1/2})_x$ wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms, at least three $R^a$ substituents in the branched siloxane being alkenyl or alkynyl units; each $R^b$ substituent is selected from the group consisting of an alkyl group having from 1 to 6 carbon atoms, an aryl group, an alkoxy group, an acrylate group and a methacrylate group; and the ratio x of $(R^aR^b{}_2SiO_{1/2})$ groups to $(SiO_{4/2})$ units is in the range 2.5 to 4, with a cyclic polydiorganosiloxane and/or a substantially linear hydroxy terminated polydiorganosiloxane in the presence of 2 to 80 parts per million of a phosphazene base catalyst based on the weight of silicon-containing materials and neutralising the reaction mixture with a neutralizing agent selected from an acrylic acid polymer or silica.

3. A process according to claim 2, wherein the phosphazene base catalyst is one of the following general formulae:

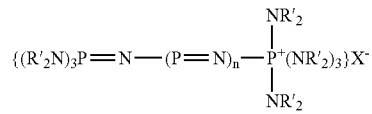

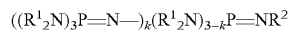

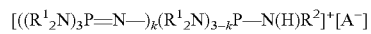

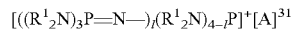

in which $R^1$, which may be the same or different in each position, is hydrogen or an optionally substituted $C_1$-$C_4$ alkyl group, or in which two $R^1$ groups bonded to the same N atom may be linked to complete a heterocyclic ring; $R^2$ is hydrogen or an optionally substituted $C_1$-$C_{20}$ alkyl group; k is 2 or 3; l is 2, 3 or 4; n is an integer in the range of 1 to 6; and [$A^-$] is an anion selected from fluoride, hydroxide, silanolate, alkoxide, carbonate or bicarbonate.

4. A process according to claim 2 wherein the phosphazene base catalyst is an aminophosphazenium hydroxide.

5. A process according to claim 2 wherein the phosphazene base catalyst is present at 2 to 40 parts per million based on the weight of silicon-containing materials in the reaction.

* * * * *